US012659281B2

(12) United States Patent
Heitz et al.

(10) Patent No.: US 12,659,281 B2
(45) Date of Patent: Jun. 16, 2026

(54) ROUTING IMPROVEMENT TO REDUCE IMPACT OF OUT-OF-RESOURCE CONDITION

(71) Applicant: Cisco Technology, Inc., San Jose, CA (US)

(72) Inventors: Jakob Heitz, Santa Clara, CA (US); Mankamana Prasad Mishra, San Jose, CA (US); Sameer R Gulrajani, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 138 days.

(21) Appl. No.: 18/427,212

(22) Filed: Jan. 30, 2024

(65) Prior Publication Data

US 2025/0247336 A1    Jul. 31, 2025

(51) Int. Cl.
*H04L 47/74*        (2022.01)
*H04L 45/02*        (2022.01)
*H04L 45/745*       (2022.01)

(52) U.S. Cl.
CPC ............ *H04L 47/748* (2013.01); *H04L 45/04* (2013.01); *H04L 45/745* (2013.01)

(58) Field of Classification Search
CPC ...... H04L 47/748; H04L 45/04; H04L 45/745
See application file for complete search history.

(56) References Cited

U.S. PATENT DOCUMENTS 10,623,322 B1 *    4/2020    Nallamothu .......... H04L 45/025
10,992,566 B1 *    4/2021    Dave ....................... H04L 67/10
2005/0025118 A1 *    2/2005    Hao ........................ H04L 45/04
                                                                370/254
2007/0121632 A1 *    5/2007    Zabarski ........... H04L 45/74591
                                                                370/395.32
2017/0289013 A1 *    10/2017    Haas ...................... H04L 45/021
2018/0367371 A1    12/2018    Nagarajan et al.
2019/0182145 A1 *    6/2019    Yan ........................ H04L 45/20
2021/0250275 A1    8/2021    Chen et al.
2025/0007821 A1 *    1/2025    Haas ...................... H04L 45/24

FOREIGN PATENT DOCUMENTS

WO        2023039831 A1    3/2023

* cited by examiner

*Primary Examiner* — Vivek Srivastava
(74) *Attorney, Agent, or Firm* — Polsinelli P.C.

(57)    ABSTRACT

Disclosed are methods, controllers, and network devices that reduce the impact of an out of resource event for a network device. In one example, a controller can analyze routing information to determine which of a plurality of prefixes are dispensable based on several factors, such as the specificity of the prefix, the frequency of use of the prefix, the geographic area through which the prefix passes, and the extent to which upstream network devices rely on the prefix. Thereafter, the controller can remove the dispensable prefixes to resolve the out of network condition. In another example, the network device itself performs the analysis of which prefixes are dispensable and communicates that information to the controller. In either scenario, the controller can reduce micro-loops and sub-optimal forwarding during an out of resource condition for the network device by removing prefixes that have a lesser impact on the network as a whole.

20 Claims, 5 Drawing Sheets

200

AS 212

142

202

142

202

202

AS 210

202

202

142

AS 206

142

202

142

202

142

142

202

142

AS 208

142

202

AS 204

142

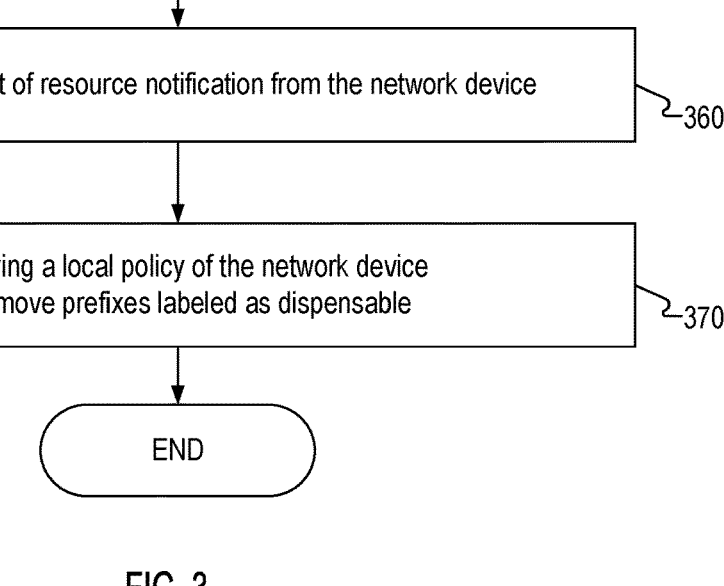

300

START

Receiving communication from network device indicating routing information of prefixes routed by the network device ~310

Assigning prefix value to at least some of the prefixes ~320

Determining whether the prefix value exceeds a discard value ~330

N → Labeling prefix as not dispensable ~340

Y

Labeling prefix as dispensable ~350

Receiving an out of resource notification from the network device ~360

Modifying a local policy of the network device to remove prefixes labeled as dispensable ~370

END

FIG. 3

ROUTING IMPROVEMENT TO REDUCE IMPACT OF OUT-OF-RESOURCE CONDITION

TECHNICAL FIELD

The present disclosure relates generally to reducing the impact of an out-of-resource ("OOR") condition of a network device.

BACKGROUND

The Border Gateway Protocol (BGP) has been the primary routing protocol in most segments of networks to carry prefixes and related information. BGP has been relied upon for network devices to communicate with one another and share relevant information. An increasing number of network devices are being added to networks, straining network resources and causing out-of-resource (OOR) conditions on routers and other network devices.

An OOR condition means the resources of the router are used extensively and the resources are reaching their threshold limits. For example, if a router can only route 30 million paths but is being controlled to route 40 million paths, the router will output an OOR notification to indicate it is beyond its capacity. In this case, a user can typically manually change the router's policy to remove some of the prefixes so as to eliminate some of the paths being routed and remedy the OOR condition. However, removing paths may cause micro-loops or limit optimal routing of paths.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 3 illustrates an exemplary process for reducing the impact of an OOR condition from the perspective of a network controller in accordance with some embodiments of the present technology;

DESCRIPTION

Figure 1:
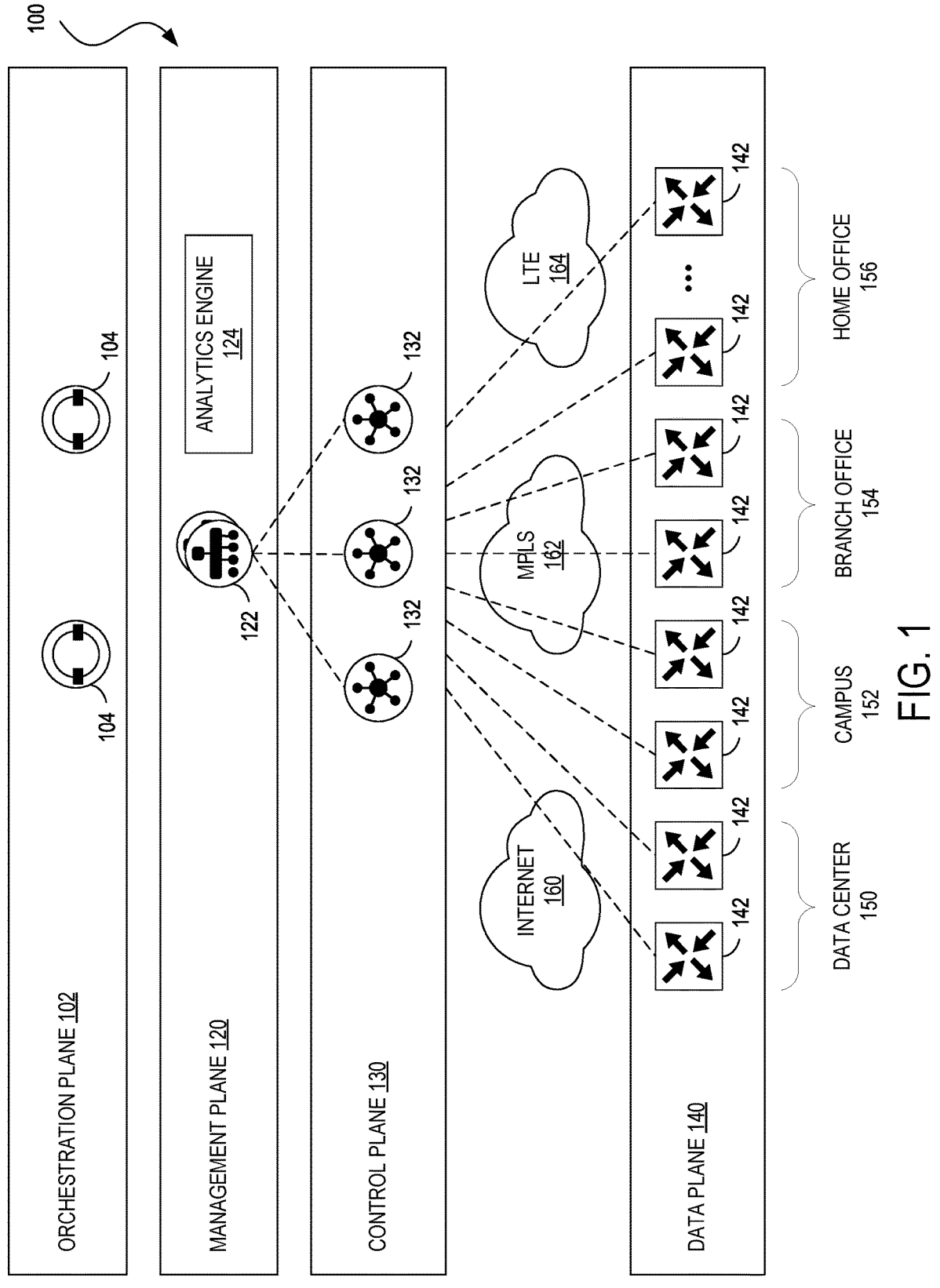
FIG. 1 illustrates an example of a high-level network architecture in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Systems, methods, and computer-readable media are provided for reducing the impact of an out of resource condition of a network device on the network as a whole. Conventionally, a network device such as a router would experience an out of resource event indicating it was using all or almost all of its resources. Network administrators would then manually remove prefixes to resolve the out of resource condition. But doing so removed prefixes that were heavily relied upon by upstream routers, thus causing sub-optimal routing. Removal of prefixes also resulted in micro-loops due to the ad hoc nature of the removal and the lack of analysis of the impact the removal would have on a network-wide scale.

The presently-disclosed embodiments improve upon the conventional systems by providing systems, methods, computer-readable media, network devices, and controllers that remove prefixes based on the likelihood that the removal will create loops or sub-optimal routing. For example, a controller can analyze routing information to determine which of a plurality of prefixes are dispensable based on several factors, such as the specificity of the prefix, the frequency of use of the prefix, the geographic area through which the prefix passes, and the extent to which upstream network devices rely on the prefix. Thereafter, the controller can remove the dispensable prefixes to resolve the out of network condition. In another example, the network device itself performs the analysis of which prefixes are dispensable and communicates that information to the controller. In either scenario, the controller can reduce micro-loops and sub-optimal forwarding during an out of resource condition for the network device by removing prefixes that have a lesser impact on the network as a whole.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Example Embodiments

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of network devices 142 (e.g., switches, routers, etc.) in an overlay network. The orchestration plane 102 can include one or more physical or virtual network orchestrator appliances 104. The network orchestrator appliance(s) 104 can perform the initial authentication of the network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller(s) 132. The network controller(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller(s) 132 can operate as route reflectors. The network controller(s) 132 can also orchestrate secure connectivity in the data plane 140 between and among the network devices 142. For example, in some embodiments, the network controller(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller(s) 132.

The data plane 140 can be responsible for forwarding packets based on decisions from the control plane 130. The data plane 140 can include the network devices 142, which can be physical or virtual network devices. The network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The network devices 142 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the network devices 142.

Figure 2:
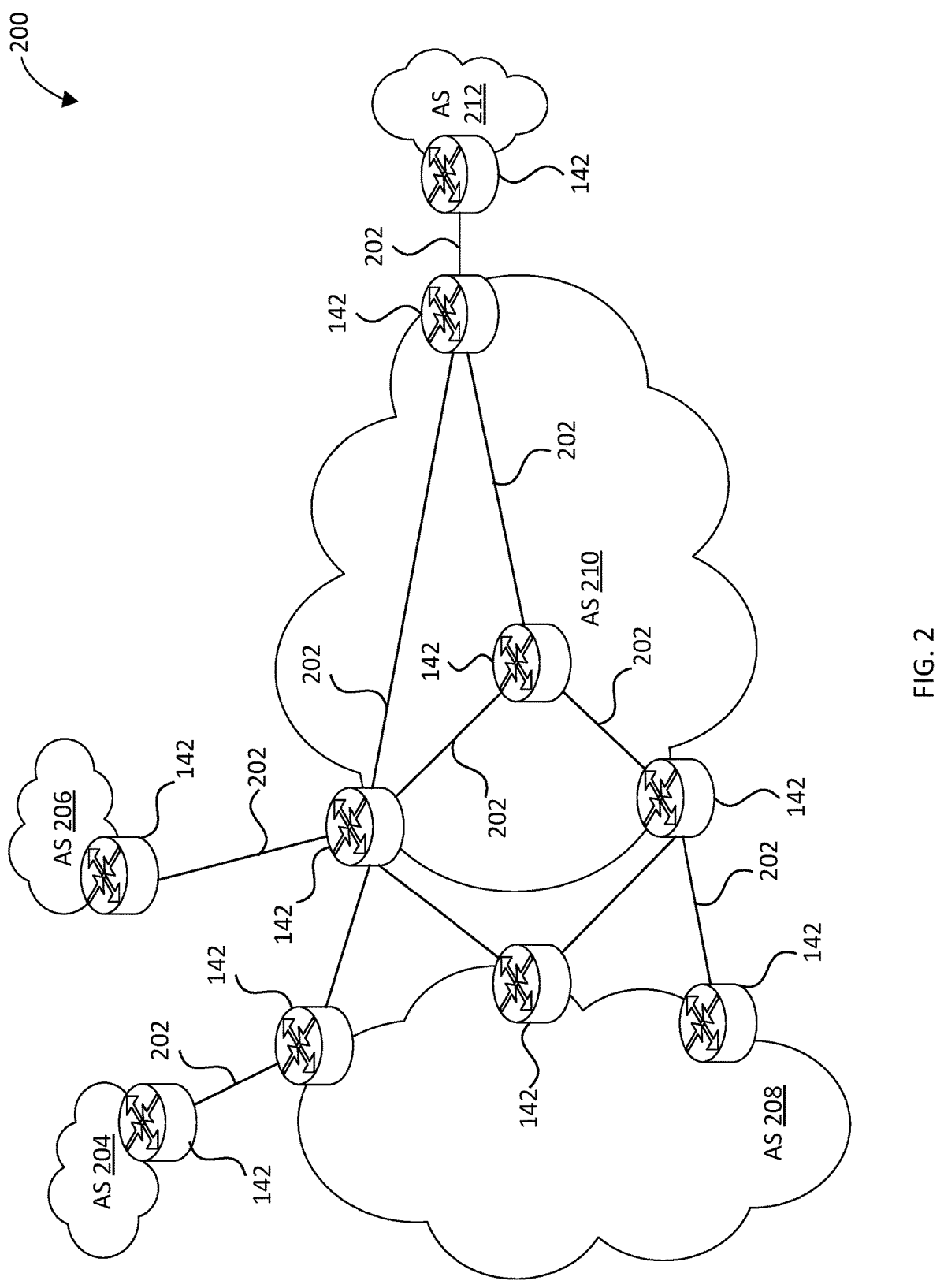
FIG. 2 illustrates an example communication network including one or more autonomous systems (ASes) in accordance with some embodiments of the present technology.

FIG. 2 is a schematic block diagram of an example computer network. A computer network is a geographically distributed collection of nodes interconnected by communication links and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. An Autonomous System (AS) is a network or group of networks under common administration and with common routing policies. A typical example of an AS is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more ASes, the network elements of the ASes need to exchange routing information to various network destinations. Border Gateway Protocol (BGP) is an Exterior Gateway Protocol (EGP) that is used to exchange routing information among network elements (e.g., routers) in the same or different ASes. A computer host that executes a BGP process is typically referred to as a BGP host or a BGP network device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an AS are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

As shown in FIG. 2, the network 200 includes network devices 142 interconnected by various methods of communication. For instance, the links 202 may be any suitable combination of wired links and shared media (e.g., wireless links, Internet Exchange Points, etc.) where certain network devices 142, such as, e.g., routers, computers, etc., may be in communication with other network devices 142, e.g., based on distance, signal strength, current operational status, location, etc. Those skilled in the art will understand that any number of network devices 142, links, etc. may be used in the computer network, and that the view shown herein is for simplicity.

Data packets (e.g., traffic and/or messages sent between the network devices 142) may be exchanged among the network devices 142 of the computer network 200 using predefined network communication protocols such as certain known wired protocols, as well as wireless protocols or other shared-media protocols where appropriate.

The computer network 200 includes a set of autonomous systems (AS) 204, 206, 208, 210 and 212. The computer network 200 may be positioned in any suitable network environment or communications architecture that operates to manage or otherwise direct information using any appropriate routing protocol or data management standard. For example, computer network 200 may be provided in conjunction with a border gateway protocol (BGP).

As noted above, an AS may be a collection of connected Internet Protocol (IP) routing network devices 142 under the control of one or more network operators that presents a common, clearly defined routing policy to a network (e.g., the Internet). Usually, an AS comprises network devices 142 that are established on the edge of the system, and that serve as the system's ingress and egress points for network traffic. Moreover, the network devices 142 may be considered edge network devices, border routers, or core network devices within the respective AS. These network devices typically, but not always, are routers or any other element of network infrastructure suitable for switching or forwarding data packets according to a routing protocol or switching protocol. For the purposes of the present disclosure, the network devices 142 located within an AS may alternatively be referred to as "forwarding network devices" or "intermediate network devices." Moreover, for illustration purposes, the ASes 204, 206, 208, 210, and 212 are shown with a limited number of network devices 142. In an actual implementation, however, an AS normally comprises numerous routers, switches, and other elements.

Each AS 204, 206, 208, 210, and 212 may be associated with an Internet Service provider (ISP). Even though there may be multiple ASes supported by a single ISP, the Internet only sees the routing policy of the ISP. That ISP must have an officially registered Autonomous System Number (ASN). As such, a unique ASN is allocated to each AS for use in BGP routing. ASNs are important primarily because they uniquely identify each network on the Internet.

To facilitate the routing of network traffic through the ASes, or more specifically, the network devices 142 within the ASes, the network devices may exchange routing information to various network destinations. As described above, BGP is conventionally used to exchange routing and reachability information among network devices 142 within a single AS or between different ASes. One particular example of BGP is BGPv4, as defined in Request for Comments (RFC) 1771 of the Internet Engineering Task Force (IETF). Various embodiments may implement other versions of BGP, however, and the use of BGPv4 is not required. The BGP logic of a router is used by the data collectors to collect BGP AS path information, e.g., the "AS_PATH" attribute, as described further below, from BGP tables of border routers of an AS, to construct paths to prefixes.

To exchange BGP routing information, two BGP hosts (network devices 142), or peers, first establish a transport protocol connection with one another. Initially, the BGP peers exchange messages to open a BGP session, and, after the BGP session is open, the BGP peers exchange their entire routing information and also provide their routing information to the controller. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

In one embodiment, the controller 132 efficiently maintains a dynamically updated routing table through the utilization of BGP messages. The controller establishes and manages BGP sessions with neighboring routers, facilitating the exchange of routing information. Upon detecting changes in network topology or receiving updates from peer routers, the controller generates BGP UPDATE messages containing pertinent route details. These messages include information on reachable IP prefixes and associated attributes, enabling the controller to adapt its routing table accordingly. Leveraging the BGP decision process, the controller 132 selectively evaluates and incorporates the received routes based on factors such as path, origin code, and path length. The periodic exchange of KEEPALIVE messages ensures the continuous availability of BGP peers, while incremental updates contribute to network efficiency by transmitting only relevant changes. Through this approach, the controller 132 achieves rapid and precise updates to the routing table, enhancing the overall performance and responsiveness of the network.

The BGP routing information may include the complete route to each network destination, e.g., "destination network device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/ 16". The "/16" indicates that the first 16 bits are used to identify the unique network leaving the remaining bits in the address to identify the specific hosts within this network.

A path joining a plurality of ASes, e.g., links 202, may be referred to as an "AS_PATH." The AS_PATH attribute indicates the list of ASes that must be traversed to reach the address destination. For example, as illustrated in FIG. 2, the AS 212 may store an AS_PATH attribute of "204 206 210 212" where the address destination is the AS 212 (or a particular IP address within AS 212). Here, the AS_PATH attribute indicates that the path to the address destination AS 212 from AS 208 passes through ASes 204, 206 and 210, in that order.

Although it may be preferable that all network devices 142 in the respective ASes 204, 206, 208, 210, and 212 be configured according to BGP, in a real-world implementation, it may be unlikely that each network device communicates using BGP. Thus, the disclosed embodiments are applicable to scenarios where all network devices 142 in the computer network 200 are configured according to BGP, as well as scenarios where only a subset of the network devices 142 is configured as such. Moreover, between any of the ASes, there may be a single communication path 202, e.g., between AS 204 and AS 208, as shown in FIG. 2, or there may be multiple communication paths 202, e.g., between AS 208 and AS 210. Thus, the disclosed embodiments are applicable to either case, as described in further detail below.

Moreover, a security extension to the BGP has been developed, referred to as BGPSEC, which provides improved security for BGP routing. BGP does not include mechanisms that allow an AS to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an AS number to a public signature verification key, the corresponding private key of which is held by one or more BGP speakers within this AS. Private keys corresponding to public keys in such certificates can then be used within BGPSEC to enable BGP speakers to sign on behalf of their AS. The certificates thus allow a relying party to verify that a BGPSEC signature was produced by a BGP speaker belonging to a given AS. Thus, a goal of BGPSEC is to use signatures to protect the AS Path attribute of BGP update messages so that a BGP speaker can assess the validity of the AS Path in update messages that it receives. It should be understood, however, that the embodiments for implementing AS Path security disclosed herein are not limited to BGPSEC; certain embodiments may, additionally or alternatively, be applicable to other suitable protocols, including, for example, SoBGP, S-BGP, and PGPBGP, to name just a few.

FIG. 3 illustrates an example method 300 for reducing the impact of an OOR condition from the perspective of a network controller, such as network controller 132. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method 300 includes receiving a communication from a network device including routing information of prefixes routed by the network device at block 310. For example, the routing information can include information relating to the prefixes that impact the overall network where, if the prefixes were removed, would create sub-optimal routing of the network. These factors can be predetermined and can include a specificity of the prefix, a frequency of use of the prefix, an availability of alternative prefixes for upstream network devices, a geographic area through which the prefix passes, and a use of the prefix by upstream network devices. For example, more specific prefixes are more likely to create optimal routing by providing data packets in a more direct manner. Prefixes that are more frequently used by the network device 142 or other network devices 142 (e.g., upstream network devices 142) are also generally considered more helpful to the optimization of the network routing. A prefix is generally considered more dispensable when upstream network devices have more alternative prefixes available to route a data packet. The geographic area through which the prefix passes can be instructive-a packet that travels through another country is generally less preferred than a data packet that travels solely within one country, due to privacy, data sensitivity, and military intelligence purposes. A use of the prefix by upstream network devices 142 may show that the prefix should not be removed because it is being relied upon by upstream network devices 142 to route data packets. The above list is exemplary only and is not meant to limit the factors that can be used to determine the dispensability of a prefix in the event of an out of resource condition of a network device 142.

According to some examples, the method 300 includes assigning a prefix value to at least some of the prefixes based on the predetermined factors at block 320. For example, the network controller(s) 132 (also referred to herein as a "controller" for shorthand) illustrated in FIG. 1 may assign a prefix value to at least some of the prefixes based on the predetermined factors to allow the method 300 to determine which of the prefixes are dispensable. This prefix value may be numeric, alphabetic, or any other quantitative or qualitative measurement to assist in determining the dispensability of the prefix.

According to some examples, the method 300 includes determining whether the prefix value exceeds a discard value at block 330. For example, the network controller(s) 132 illustrated in FIG. 1 may compare the prefix value of the prefix analyzed in step 320 with a predetermined prefix value (referred to herein as a "discard value") that is the threshold for determining whether the prefix is dispensable. Alternatively, the discard value can be determined dynamically based on an analysis of the prefixes that may or may not be removed. For example, the prefixes may each be quantified with a numeric value that determines their dispensability based on the factors described above, and the discard value can be determined based on the number of prefixes that need to be removed. If, for example, 10 million out of 40 million prefixes need to be removed, the method 300 can dynamically generate a discard value that separates the 10 million more dispensable prefixes from the remainder so as to resolve the out of resource condition while removing those prefixes that are more dispensable. As used herein, the term "exceeds" a discard value is not meant to limit the disclosure to a determining step that requires one number to be larger than the discard value. Rather, any manner of establishing a threshold via the discard value, and separating the dispensable prefixes from the indispensable prefixes, can be implemented. Also as used herein, the term "out of resource condition" can be any threshold value of resource utilization (e.g., a predetermined, user-defined, and/or real-time determined threshold), but in some embodiments, the out of resource notification indicates the network device 142 has reached or exceeded 75% of its resource utilization.

According to some examples, the method 300 includes labeling a prefix as not dispensable at block 340, or labeling the prefix as dispensable at block 350, based on the result of block 330. For example, the network controller(s) 132 illustrated in FIG. 1 may label the prefix as dispensable if the prefix value exceeds the discard value, and label the prefix as not dispensable if the prefix value does not exceed the discard value. This process allows the method 300 to easily remove the prefix in the event of an out of resource condition of the network device 142.

Blocks 310-350 can generally be referred to as analyzing the routing information to determine which of the prefixes are dispensable. For example, blocks 310-350 can analyze the routing information provided by the communication from the network device 142 and compare the routing information to routing information of other network devices 142 to determine at least one prefix of the prefixes that, if removed from a routing table of the network device 142, would result in a less efficiency reduction for routing the network traffic in the network than choosing another prefix to remove. Such a determination can be made by discard logic of the network controller(s) 132. However, the method 300 need not assign numeric values to the prefixes to make this determination. Any manner of identifying dispensable prefixes can be implemented. Also, the analyzing the routing information may be performed more frequently by the network controller(s) 132 as the network device 142 approaches the out of resource condition. For example, the network controller(s) 132 may not analyze the routing information at all until the network device 142 is at 80% of its capacity. The network controller(s) 132 may thereafter analyze the routing information more frequently as the network device 142 continues toward the out of resource condition, i.e., as it increases from 80-100% of resource usage.

According to some examples, the method 300 includes receiving an out of resource notification from the network device at block 360. For example, the network controller(s) 132 illustrated in FIG. 1 may receive an out of resource notification from one of the network devices 142. This out of resource notification can be caused by the network device 142 being instructed to route more paths than it has the capacity to route. For example, the network device 142 may only be able to route 30 million paths, but is being instructed to route 40 million paths. In this case, the network device 142 would communicate an out of resource notification to the network controller(s) 132 indicating the network device 142 is unable to route the full amount of paths. In some examples, the network controller(s) 132 have previously determined which of the prefixes are dispensable as discussed above, and is proactively ready to remove such prefixes to resolve the out of resource condition.

According to some examples, the method 300 includes modifying a local policy of the network device to remove the one or more prefixes that are labeled as dispensable at block 370. For example, the network controller(s) 132 illustrated in FIG. 1 may modify a local policy of the network device to remove the one or more prefixes that are causing the out of resource notification. In doing so, the network controller(s) 132 can resolve the out of resource condition while removing only those prefixes deemed dispensable by the method 300. The network as a whole can operate more efficiently, and micro-loops can be reduced.

According to some examples, the method 300 includes communicating with an upstream network device 142 to notify the upstream network device 142 that the prefixes identified as dispensable have been removed in block 380. For example, the network controller(s) 132 illustrated in FIG. 1 may communicate with a network device 142 upstream from the network device 142 that indicated an out of resource condition that certain prefixes have been removed. In this manner, the upstream network device 142 can reroute data packets to alternative paths so as to avoid the removed prefix. In some examples, following block 380, the process 300 ends.

Figure 4:
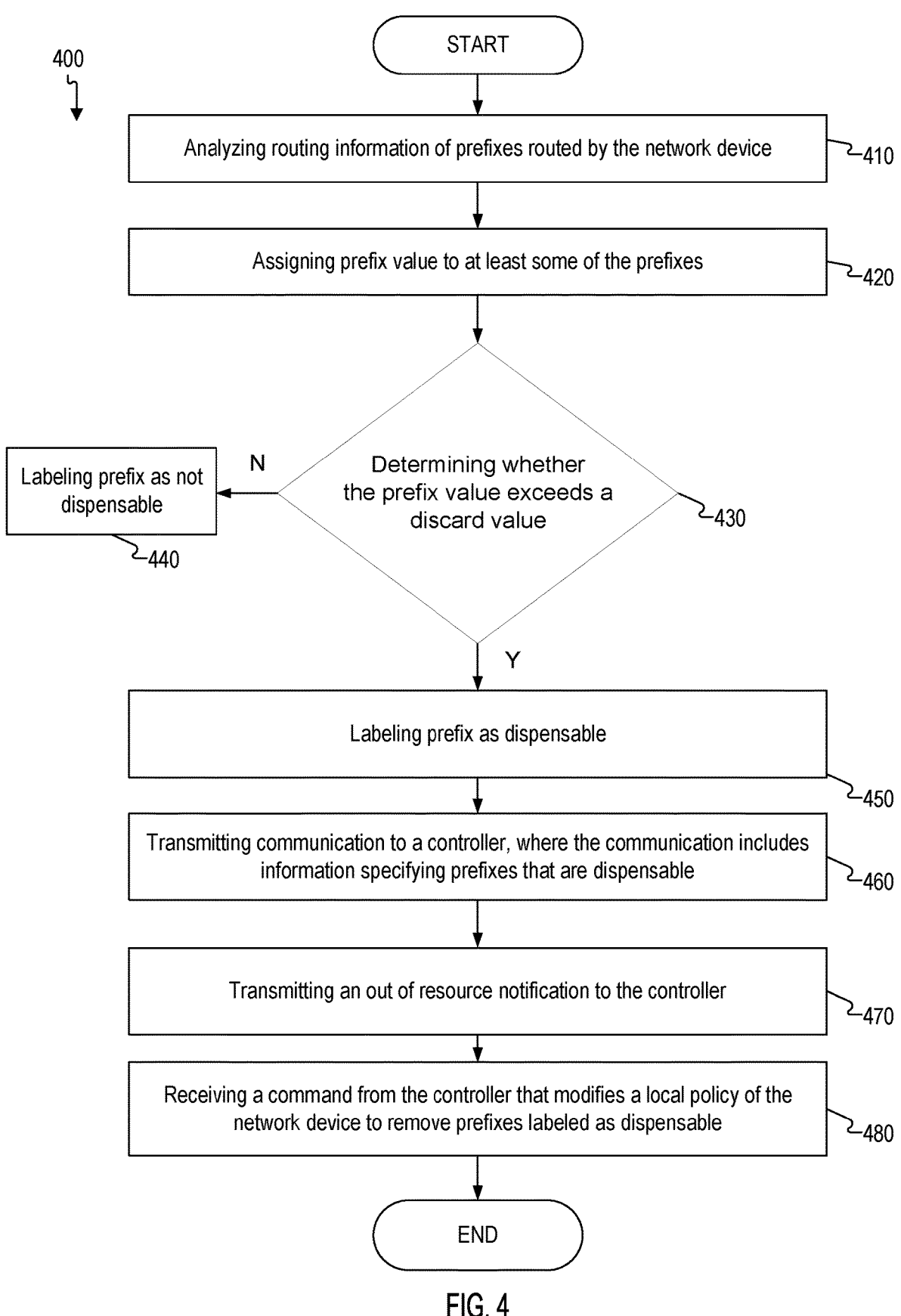
FIG. 4 illustrates an exemplary process for reducing the impact of an OOR condition from the perspective of the network device in accordance with some embodiments of the present technology.

FIG. 4 illustrates an example method 400 for reducing the impact of an OOR condition from the perspective of the network device. The method 400 is similar to the method 300 discussed above with respect to FIG. 3, but where the analyzing of the prefixes is performed by the network device 142 rather than the network controller(s) 132. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method 400 includes analyzing routing information of prefixes routed by the network device at block 410. For example, the network device 142 illustrated in FIG. 1 may analyze routing information of prefixes routed by the network device 142. This is in contrast with the method 300 of FIG. 3, where the network controller(s) 132 can analyze the routing information to determine the dispensable prefixes. The exemplary factors and steps for performing this analysis can be the same as with the method 300 of FIG. 3, albeit performed by the network device 142 either partially or entirely. For example, the predetermined factors can be at least one member selected from a group consisting of a specificity of the prefix, a frequency of use of the prefix, an availability of alternative prefixes for upstream network devices, a geographic area through which the prefix passes, and a use of the prefix by upstream network devices.

Alternatively, the network device 142 can transmit, to the network controller(s) 132, the routing information of prefixes routed by the network device 142 to determine which of the prefixes are dispensable, in block 410. In this manner, the network device can communicate the prefixes to the network controller(s) 132 and allow the network controller(s) 132 to perform the analysis of which prefixes are dispensable and which ones are not.

According to some examples, the method 400 includes assigning a prefix value to at least some of the prefixes at block 420. For example, the network device 142 illustrated in FIG. 1 may assign a prefix value to at least some of the prefixes based on predetermined factors in the same manner as discussed above with respect to the method 300 of FIG. 3. Alternatively, the network controller(s) 132 may perform this step either partially or entirely.

According to some examples, the method 400 includes determining whether the prefix value exceeds a discard value at block 430. For example, the network device 142 illustrated in FIG. 1 may determine whether the prefix value exceeds a discard value. Alternatively, the network controller(s) 132 may perform this step either partially or entirely.

According to some examples, the method 300 includes labeling a prefix as not dispensable at block 440, or labeling the prefix as dispensable at block 450, based on the result of block 430. For example, the network controller(s) 132 illustrated in FIG. 1 may label the prefix as dispensable if the prefix value exceeds the discard value, and label the prefix as not dispensable if the prefix value does not exceed the discard value. Alternatively, the network device 142 may perform this step either partially or entirely. This process allows the method 400 to easily remove the prefix in the event of an out of resource condition of the network device 142.

Blocks 410-450 can generally be referred to as analyzing the routing information to determine which of the prefixes are dispensable. However, the method 400 need not assign numeric values to the prefixes to make this determination. Any manner of identifying dispensable prefixes can be implemented. Also, the analyzing the routing information may be performed more frequently by the network device 142 and/or the network controller(s) 132 as the network device 142 approaches the out of resource condition, as discussed above in more detail with respect to the method 300 of FIG. 3.

According to some examples, the method 400 includes transmitting a communication to network controller(s) 132 (controller), where the communication includes information specifying prefixes that are dispensable, at block 460. For example, the network device 142 illustrated in FIG. 1 may transmit a communication to the network controller(s) 132, where the communication includes information specifying prefixes that are dispensable. In this manner, the network device 142 can communicate its analysis of dispensable prefixes to the network controller(s) 132 so that the network controller(s) 132 may cause the removal of the dispensable prefixes in the event of an out of resource condition of the network device 142.

According to some examples, the method 400 includes transmitting an out of resource notification to the controller at block 460. For example, the network device 142 illustrated in FIG. 1 may transmit an out of resource notification to the network controller(s) 132 indicating the network device 142 is out of resource, as described above with respect to the method 300 of FIG. 3.

According to some examples, the method 400 includes receiving a command from the network controller(s) 132 that modifies a local policy of the network device 142 to remove prefixes labeled as dispensable in block 480. In doing so, the network controller(s) 132 can quickly and effectively manage the network device 142 to remove dispensable prefixes in the event of an out of resource condition, without significantly impacting the network as a whole.

Figure 5:
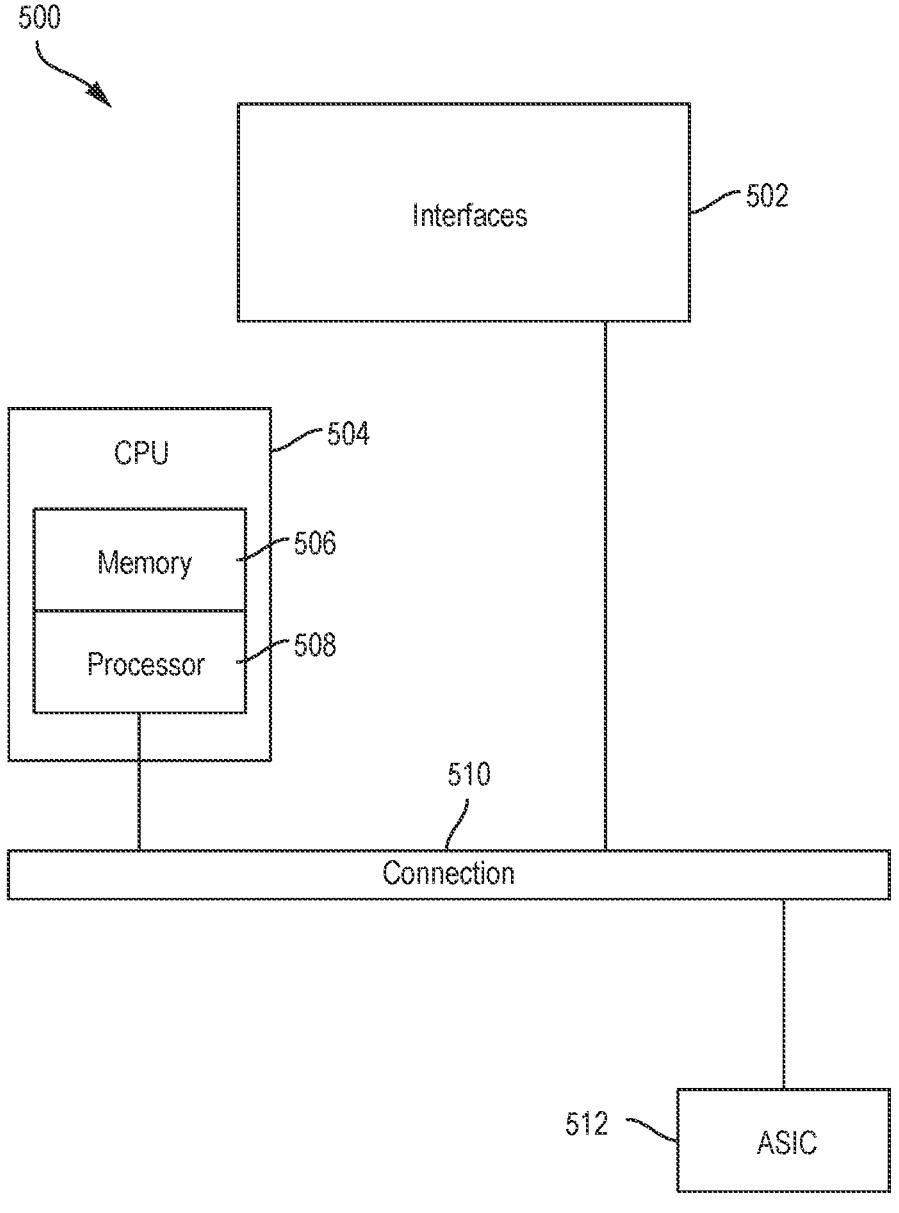
FIG. 5 illustrates an example network device in accordance with some examples of the disclosure.

FIG. 5 illustrates an example network device 500 suitable for performing switching, routing, load balancing, and other networking operations. The example network device 500 can be implemented as switches, routers, nodes, metadata servers, load balancers, client devices, and so forth. In some examples, the network device 500 can be the network device 142 discussed above.

Network device 500 includes a central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 504) to efficiently perform routing computations, network diagnostics, security functions, etc.

Although the system shown in FIG. 5 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing and/or switching operations. The ASIC can communicate with other components in the network device 500 via the bus 510, to exchange data and signals and coordinate various types of operations by the network device 500, such as routing, switching, and/or data storage operations, for example.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method of controlling a network device, the method comprising: receiving a communication from the network device including routing information of prefixes routed by the network device; analyzing the routing information to determine which of the prefixes are dispensable; receiving an out of resource notification from the network device indicating an out of resource condition of the network device; and modifying a local policy of the network device to remove the prefixes identified as dispensable.

Aspect 2. The method of Aspect 1, wherein the analyzing the routing information includes: assigning a prefix value to at least some of the prefixes based on predetermined factors; determining whether the prefix value exceeds a discard value; and labeling the prefix as dispensable if the prefix value exceeds the discard value, and labeling the prefix as not dispensable if the prefix value does not exceed the discard value.

Aspect 3. The method of any of Aspects 1 to 2, wherein the predetermined factors are at least one member selected from a group consisting of a specificity of the prefix, a frequency of use of the prefix, an availability of alternative prefixes for upstream network devices, a geographic area through which the prefix passes, and a use of the prefix by upstream network devices.

Aspect 4. The method of any of Aspects 1 to 3, wherein the analyzing the routing information is performed more frequently as the network device approaches the out of resource condition.

Aspect 5. The method of any of Aspects 1 to 4, further comprising communicating with an upstream network device to notify the upstream network device that the prefixes identified as dispensable have been removed.

Aspect 6. A controller for managing a network including a network device, the controller comprising: a storage configured to store instructions; and at least one processor configured to execute the instructions and cause the at least one processor to: receive a communication from the network device including routing information of prefixes routed by the network device; analyze the routing information to determine which of the prefixes are dispensable; receive an out of resource notification from the network device indicating an out of resource condition of the network device; and modify a local policy of the network device to remove the prefixes identified as dispensable.

Aspect 7. The controller of Aspect 6, wherein the analyze the routing information includes instructions that cause the at least one processor to: assign a prefix value to at least some of the prefixes based on predetermined factors; determine whether the prefix value exceeds a discard value; and label the prefix as dispensable if the prefix value exceeds the discard value, and label the prefix as not dispensable if the prefix value does not exceed the discard value.

Aspect 8. The controller of any of Aspects 6 to 7, wherein the predetermined factors are at least one member selected from a group consisting of a specificity of the prefix, a frequency of use of the prefix, an availability of alternative prefixes for upstream network devices, a geographic area through which the prefix passes, and a use of the prefix by upstream network devices.

Aspect 9. The controller of any of Aspects 6 to 8, wherein the analyze the routing information is performed more frequently as the network device approaches the out of resource condition.

Aspect 10. The controller of any of Aspects 6 to 9, further comprising instructions that cause the at least one processor to communicate with an upstream network device to notify the upstream network device that the prefixes identified as dispensable have been removed.

Aspect 11. A method of managing a local policy by a network device, the method comprising: analyzing routing information of prefixes routed by the network device to determine which of the prefixes are dispensable; transmitting an out of resource notification from the network device indicating an out of resource condition of the network device; and receiving a communication from a controller to modify a local policy of the network device to remove the prefixes identified as dispensable.

Aspect 12. The method of Aspect 11, wherein the analyzing the routing information includes: assigning a prefix value to at least some of the prefixes based on predetermined factors; determining whether the prefix value exceeds a discard value; and labeling the prefix as dispensable if the prefix value exceeds the discard value, and labeling the prefix as not dispensable if the prefix value does not exceed the discard value.

Aspect 13. The method of any of Aspects 11 to 12, wherein the predetermined factors are at least one member selected from a group consisting of a specificity of the prefix, a frequency of use of the prefix, an availability of alternative prefixes for upstream network devices, a geographic area through which the prefix passes, and a use of the prefix by upstream network devices.

Aspect 14. The method of any of Aspects 11 to 13, wherein the analyzing the routing information is performed more frequently as the network device approaches the out of resource condition.

Aspect 15. The method of any of Aspects 11 to 14, further comprising transmitting, to a controller, the routing information of prefixes routed by the network device to determine which of the prefixes are dispensable.

Aspect 16. A network device for managing a local policy of the network device, the network device comprising: a storage configured to store instructions; and at least one processor configured to execute the instructions and cause the at least one processor to: analyze routing information of prefixes routed by the network device to determine which of the prefixes are dispensable; transmit an out of resource notification from the network device indicating an out of resource condition of the network device; and receive a communication from a controller to modify the local policy of the network device to remove the prefixes identified as dispensable.

Aspect 17. The network device of Aspect 16, wherein the analyze the routing information includes instructions that cause the at least one processor to: assign a prefix value to at least some of the prefixes based on predetermined factors; determine whether the prefix value exceeds a discard value; and label the prefix as dispensable if the prefix value exceeds the discard value, and label the prefix as not dispensable if the prefix value does not exceed the discard value.

Aspect 18. The network device of any of Aspects 16 to 17, wherein the predetermined factors are at least one member selected from a group consisting of a specificity of the prefix, a frequency of use of the prefix, an availability of alternative prefixes for upstream network devices, a geographic area through which the prefix passes, and a use of the prefix by upstream network devices.

Aspect 19. The network device of any of Aspects 16 to 18, wherein the analyze the routing information is performed more frequently as the network device approaches the out of resource condition.

Aspect 20. The network device of any of Aspects 16 to 19, further comprising instructions that cause the at least one processor to transmit, to a controller, the routing information of prefixes routed by the network device to determine which of the prefixes are dispensable.

What is claimed is:

1. A method of controlling a network device, the method comprising:
  receiving, by a BGP controller, a communication from the network device including routing information of next-hop prefixes for forwarding network traffic by the network device;
  analyzing, by the BGP controller, the routing information and comparing the routing information to routing information of other network devices to determine at least one prefix of the prefixes that, if removed from a routing table of the network device, would result in a lower amount of efficiency reduction for routing the network traffic in the network, the analyzing including:
    associating, with at least some of the prefixes, one or more values derived from evaluating the routing information; and
    evaluating the values according to one or more criteria;
  receiving an out of resource notification from the network device indicating an out of resource condition of the network device; and
  modifying a local policy of the network device to alleviate the out-of-resource condition by first removing the at least one prefix based on the evaluating the values according to the one or more of criteria.

2. The method of claim 1,
  wherein the value is a prefix discard value assigned to at least some of the prefixes using a discard logic configured to rank the prefixes based on an effect of the prefixes on the efficiency reduction;
  wherein the evaluating the values according to one or more criteria includes determining whether the prefix discard value exceeds a discard value threshold; and
  wherein modifying the local policy includes removing the prefix if the prefix discard value exceeds the discard value threshold.

3. The method of claim 2, wherein the discard logic assigns the prefix discard value based on at least one member selected from a group consisting of a specificity of the prefix, a frequency of use of the prefix, an availability of alternative prefixes for upstream network devices, a geographic area through which the prefix passes, and a use of the prefix by upstream network devices.

4. The method of claim 1, wherein the analyzing the routing information is performed more frequently as the communication from the network device indicates the network device is approaching the out of resource condition.

5. The method of claim 1, further comprising analyzing the communication from the network device to identify an upstream network device that routes through the network device, and communicating with the upstream network device to notify the upstream network device that the prefix has been removed.

6. The method of claim 1, wherein the out of resource notification indicates the network device has reached or exceeded a threshold of resource utilization of the network device.

7. The method of claim 1, wherein the step of receiving the out of resource notification is performed after the step of analyzing.

8. A controller for managing a network including a network device, the controller comprising:
  a storage configured to store instructions; and
  at least one processor configured to execute the instructions and cause the at least one processor to:
    receive, by a BGP controller, a communication from the network device including routing information of next-hop prefixes for forwarding network traffic by the network device;
    analyze, by the BGP controller, the routing information and comparing the routing information to routing information of other network devices to determine at least one prefix of the prefixes that, if removed from a routing table of the network device, would result in a lower amount of efficiency reduction for routing the network traffic in the network, the analyzing including the steps:

associating, with at least some of the prefixes, one or more values derived from evaluating the routing information; and evaluating the values according to one or more criteria;

receive an out of resource notification from the network device indicating an out of resource condition of the network device; and modify a local policy of the network device to alleviate the out-of-resource condition by first removing the at least one prefix based on the evaluating the values according to the one or more of criteria.

9. The controller of claim 8, wherein the value is a prefix discard value assigned to at least some of the prefixes using a discard logic configured to rank the prefixes based on an effect of the prefixes on the efficiency reduction;

wherein the evaluating the values according to one or more criteria includes determining whether the prefix discard value exceeds a discard value threshold; and wherein modifying the local policy includes removing the prefix if the prefix discard value exceeds the discard value threshold.

10. The controller of claim 9, wherein the discard logic assigns the prefix discard value based on at least one member selected from a group consisting of a specificity of the prefix, a frequency of use of the prefix, an availability of alternative prefixes for upstream network devices, a geographic area through which the prefix passes, and a use of the prefix by upstream network devices.

11. The controller of claim 8, wherein the analyzing the routing information is performed more frequently as the communication from the network device indicates the network device is approaching the out of resource condition.

12. The controller of claim 8, further comprising analyzing the communication from the network device to identify an upstream network device that routes through the network device, and communicating with the upstream network device to notify the upstream network device that the prefix has been removed.

13. The controller of claim 8, wherein the out of resource notification indicates the network device has reached or exceeded a threshold of resource utilization of the network device.

14. The controller of claim 8, wherein the step of receiving the out of resource notification is performed after the step of analyzing.

15. A non-transitory computer-readable storage medium for automated management of a subscription service provided by a subscription provider, the computer-readable storage medium including instructions that, when executed by at least one processor, cause the least one processor to:

receive, by a BGP controller, a communication from the network device including routing information of next-hop prefixes for forwarding network traffic by the network device;

analyze, by the BGP controller, the routing information and comparing the routing information to routing information of other network devices to determine at least one prefix of the prefixes that, if removed from a routing table of the network device, would result in a least amount of efficiency reduction for routing the network traffic in the network, the analyzing including:

associating, with at least some of the prefixes, one or more values derived from evaluating the routing information; and evaluating the values according to one or more criteria;

receive an out of resource notification from the network device indicating an out of resource condition of the network device; and modify a local policy of the network device to alleviate the out-of-resource condition by first removing the at least one prefix based on the evaluating the values according to the one or more of criteria.

16. The computer-readable storage medium of claim 15, wherein the value is a prefix discard value assigned to at least some of the prefixes using a discard logic configured to rank the prefixes based on an effect of the prefixes on the efficiency reduction;

wherein the evaluating the values according to one or more criteria includes determining whether the prefix discard value exceeds a discard value threshold; and wherein modifying the local policy includes removing the prefix if the prefix discard value exceeds the discard value threshold.

17. The computer-readable storage medium of claim 16, wherein the discard logic assigns the prefix discard value based on at least one member selected from a group consisting of a specificity of the prefix, a frequency of use of the prefix, an availability of alternative prefixes for upstream network devices, a geographic area through which the prefix passes, and a use of the prefix by upstream network devices.

18. The computer-readable storage medium of claim 15, wherein the analyzing the routing information is performed more frequently as the communication from the network device indicates the network device is approaching the out of resource condition.

19. The computer-readable storage medium of claim 15, further comprising analyzing the communication from the network device to identify an upstream network device that routes through the network device, and communicating with the upstream network device to notify the upstream network device that the prefix has been removed.

20. The computer-readable storage medium of claim 15, wherein the out of resource notification indicates the network device has reached or exceeded a threshold of resource utilization of the network device.

* * * * *